United States Patent
Kehiaian et al.

(10) Patent No.: US 9,567,160 B2
(45) Date of Patent: Feb. 14, 2017

(54) CORRIDOR FOR TRANSPORTING ABRASIVE IN AN IMPACT CHAMBER AND A METHOD FOR MOVING AN AXLE SET IN THE IMPACT CHAMBER HAVING THE CORRIDOR FOR TRANSPORTING ABRASIVE

(71) Applicant: SCITEEX SP. Z.O.O., Warsaw (PL)

(72) Inventors: Armand Kehiaian, Warsaw (PL); Marek Kozlowski, Warsaw (PL); Slowomir Ziecina, Ruda Talubska (PL)

(73) Assignee: SCITEEX SP. Z.O.O., Warsaw (PL)

( * ) Notice: Subject to any disclaimer, the term of this patent is extended or adjusted under 35 U.S.C. 154(b) by 0 days.

(21) Appl. No.: 14/759,102

(22) PCT Filed: Jan. 7, 2014

(86) PCT No.: PCT/PL2014/000001
§ 371 (c)(1),
(2) Date: Jul. 2, 2015

(87) PCT Pub. No.: WO2014/107116
PCT Pub. Date: Jul. 10, 2014

(65) Prior Publication Data
US 2015/0336743 A1   Nov. 26, 2015

(30) Foreign Application Priority Data
Jan. 4, 2013   (PL) .......................................... 402365

(51) Int. Cl.
B65G 19/28   (2006.01)
B65G 21/22   (2006.01)

(52) U.S. Cl.
CPC ............... B65G 19/28 (2013.01); B65G 21/22 (2013.01)

(58) Field of Classification Search
CPC ................................ B65G 19/28; B65G 21/22
USPC  198/717, 722, 725, 728, 729, 730; 104/162, 104/172.1
See application file for complete search history.

(56) References Cited

U.S. PATENT DOCUMENTS

| 3,526,193 A | 9/1970 | Vani |
| 3,790,007 A | 2/1974 | Sprague |
| 4,018,329 A | 4/1977 | Jarvis |

(Continued)

FOREIGN PATENT DOCUMENTS

| DE | 17 75 984 U | 10/1958 |
| DE | 11 41 943 B | 12/1962 |
| DE | 10 2010 045013 A1 | 3/2012 |

*Primary Examiner* — Douglas Hess
(74) *Attorney, Agent, or Firm* — Andrew W. Chu; Craft Chu PLLC (57) ABSTRACT

The corridor for transporting abrasive in an impact chamber is laterally limited by longitudinal sections resting on a foundation slab. The corridor has a traction system for moving an axle set along a transport track, the traction system being provided with a substantially horizontal loop including loop return wheels and a loop connector having two bands moving in opposite directions. Each band of the loop connector is placed in an individually assigned guiding slot, arranged on top of the longitudinal section. There is a method for moving an axle set in an impact chamber having a corridor for transporting abrasive, wherein each band of the loop connector is carried in the immediate vicinity of the side edge of the corridor for transporting abrasive, on top of the longitudinal section.

16 Claims, 5 Drawing Sheets

(56) References Cited

U.S. PATENT DOCUMENTS

| | | | | |
|---|---|---|---|---|
| 4,342,387 | A | * | 8/1982 | Gray ................... B60S 3/004 198/746 |
| 4,410,081 | A | * | 10/1983 | Weihe, Jr. ............. B65G 17/22 134/70 |
| 5,133,264 | A | * | 7/1992 | Belanger ............... B65G 19/02 104/162 |
| 5,443,014 | A | * | 8/1995 | Belanger ............... B60S 3/004 104/172.3 |
| 5,638,942 | A | | 6/1997 | Dupuit |
| 5,730,061 | A | * | 3/1998 | Stufflebeam ........... B60S 3/004 104/172.3 |
| 9,371,059 | B2 | * | 6/2016 | MacNeil ................. B60S 3/00 |

\* cited by examiner

Fig. 6

CORRIDOR FOR TRANSPORTING ABRASIVE IN AN IMPACT CHAMBER AND A METHOD FOR MOVING AN AXLE SET IN THE IMPACT CHAMBER HAVING THE CORRIDOR FOR TRANSPORTING ABRASIVE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The invention relates to a corridor for transporting abrasive in an impact chamber and to a method for moving an axle set in the impact chamber having the Corridor for transporting abrasive.

2. Description of Related Art Including Information Disclosed Under 37 CFR 1.97 and 37 CFR 1.98.

Corridors, arranged in parallel, for transporting abrasive are commonly used in automated systems for abrasive recirculation in impact chambers. Corridors constitute an underside of the chamber, and therefore it is usually required that the corridors have the smallest possible height (preferably 100-150 mm) regardless of whether the corridors are located above the surface of the floor (in order to minimize the threshold for an operator and the height of the rail head for technological transport) or they are recessed in the floor (in order to minimize the foundation recess). Bottom of the corridor is constituted by a concrete substrate, for example a foundation slab, which is optionally covered with a steel sheet. Corridors are closed on the sides by stationary longitudinal sections. Corridors are covered with platform gratings supported by the longitudinal sections, forming a flat workspace for the operator.

In the space below the platform of the corridor, there are sweeping frames equipped with scrapers. The sweeping frames are set into a reciprocating motion to move abrasive material and waste materials created as a by-product of the impact treatment. These solutions are known, for example, from patent description EP 0430741 and patent description U.S. Pat. No. 5,638,942.

Elements, especially of considerable weights, to be treated by impact are transported to the chamber by means of axle sets moving along rails, the axle sets being driven by an external driving unit via a transport connector (such as a rope or a chain). The connector (having an operating band and return band of connector) is carried in a loop system realized in a vertical plane or in a horizontal plane.

When using the loop system in a vertical plane, in the known solutions, the operating connector is carried in the level of platform gratings, and a return connector below the platform gratings. With a view to withdrawing the abrasive, in order to ensure that the connector guides (operating and return bands) are unoccluded, a scraper system for transporting abrasive, located below a lower guide of the connector to ensure gravitational discharging of the abrasive from the guides, is introduced. As the minimum width of the loop typically amounts to at least 200 mm, in the indicated solution of the corridor for transporting abrasive, the height of the corridor has to be above 200 mm, and usually about 400 mm because machines cooperating with the loop have to be mounted on a foundation with a larger recess.

In the prior art, a traction system employing the loop system in a horizontal plane, width of the loop typically amounting to at least 200 mm, wherein the connector (both the operating and return bands) is carried in the level of the platform gratings, is also used. Abrasive from the connector guides is withdrawn by gravity into the space in which the sweeping frames are located. The solution requires the use of sectional gratings which rest on an additional intermediate supporting frame resulting in an increased height of the corridor (by at least the height of the supporting frame, i.e. 80-100 mm). Taking into account the height of the sweeping system components (about 150 mm), this results in the increase in height of the corridor to at least 230 mm, and usually to about 350 mm. Moreover, mounting the connector guides in the level of platform gratings and using the intermediate supporting frame impede access to the sweeping frames and the scrapers, and realization of such a construction increases labor and material costs.

The aim of the invention is to provide a corridor for transporting abrasive in an impact chamber and a method for moving an axle set in the impact chamber having the corridor for transporting abrasive, the solutions being at least partially free from the above mentioned disadvantages.

SUMMARY OF THE INVENTION

A corridor for transporting abrasive in an impact chamber, laterally limited by longitudinal sections based on a foundation slab, having a traction system for moving an axle set along a transport track, said traction system being equipped with a substantially horizontal loop including loop return wheels and a loop connector having two bands moving in opposite directions, according to the invention is characterized in that each band of the loop connector is placed in an individually assigned guiding slot, arranged on top of the longitudinal section. Preferably, the top of the longitudinal section is equipped with through voids for withdrawing abrasive, at least in the area of the guiding slot. In particular, the guiding slot is defined by a bar assembly mounted on top of the longitudinal section. The bar assembly includes, especially, two bars running in parallel, equidistant relative to each other by the width of the guiding slot.

Preferably, the longitudinal sections limiting the corridor are U-sections with their flanges directed towards each other so that one flange of each U-section is based on the foundation slab, and the external side of the other flange constitutes the top of the longitudinal section. In particular, the through voids for withdrawing abrasive are made in a flange of the longitudinal section only in the area of the guiding slot. In the longitudinal U-section, especially, reinforcing ribs extending substantially vertically between the flanges of the longitudinal section are mounted.

Optionally, the longitudinal sections limiting the corridor constitute ribbed structures arranged specularly relative to each other, wherein each structure has a plurality of transverse ribs of a width defining the section width, said ribs being mounted to a formed longitudinal element fixing the position of the ribs vertically and at selected intervals, wherein upper edges of the ribs define the top of the longitudinal section for mounting the bar assembly, and the formed longitudinal element forms a surface which laterally delimits the workspace of the corridor for transporting abrasive between the longitudinal sections. In particular, the formed longitudinal element is made as a formed blank from a flat sheet, said blank including cuts for accommodating the ribs.

Preferably, the loop connector is a chain connector having horizontal links and vertical links, wherein the horizontal link rests on the upper surface of the bar assembly, and the vertical link is partially recessed in the guiding slot, the depth of which being selected so that there is a gap between the bottom edge of the vertical link and the longitudinal section, more preferably said gap corresponding to at least twice the dimension of the abrasive grain diameter.

Optionally, the loop connector is a rope, and depth of the guiding slot is selected so that it corresponds to at least the dimension of the rope diameter increased by the gap dimension, preferably the gap approximately corresponding to at least twice the dimension of the abrasive grain diameter.

Preferably, a rail element of the transport track is mounted externally to the guiding slot, on top of the longitudinal section.

Optionally, a rail element of the transport track in the form of a rail is mounted externally to the guiding slot and next to the longitudinal section.

A method for moving an axle set in an impact chamber having a corridor for transporting abrasive, said corridor being laterally limited by longitudinal sections resting on a foundation slab, having a traction system for moving the axle set along a transport track, said traction system being equipped with a substantially horizontal loop including loop return wheels and a loop connector having two bands moving in opposite directions, according to the invention is characterized in that each band of the loop connector is carried in the immediate vicinity of the side edge of the corridor for transporting abrasive, on top of the longitudinal section. Preferably, the abrasive being accumulated on top of the longitudinal section is withdrawn into a space between the longitudinal sections of the Corridor via the through voids in the longitudinal section.

Preferably, each band of the loop connector is carried in an individually assigned guiding slot, defined by a bar assembly mounted on top of the longitudinal section.

Preferably, the axle set moves along the transport track including rail elements arranged in parallel to the axis of the corridor, each rail element being mounted on top of the longitudinal section, externally to the bar assembly.

Optionally, the axle set moves along the transport track including rail elements arranged in parallel to the axis of the corridor, each rail element being in the form of a rail mounted externally to the longitudinal section.

The solution according to the invention provides a corridor for transporting abrasive in an impact chamber of a height not exceeding 150 mm, said corridor having specifically arranged guiding slots for guiding the connector, i.e. for guiding, in the loop, a rope or a chain of the traction drive of the axle sets (for example industrial rail cars) especially with a lifting capacity of more than 1 ton. According to the invention, the traction system is made as a horizontal loop system having a width equal to the corridor width, thanks to the guiding slots of the traction system, arranged on the stationary longitudinal sections of the corridors. The said stationary longitudinal sections of the corridors constitute at the same time a support for the platform gratings, which distinguishes the invention in relation to the prior art.

In the solution according to the invention, the loop is not carried above the frame with the scrapers, whereby service access is facilitated. Additional support for platform gratings is not needed so that a nominal height of the corridor is maintained, i.e. typically 120-150 mm. It is not necessary to divide the grating either, whereby it is less expensive to construct the corridor.

As a result of using the corridor for transporting abrasive, according to the invention, the impact chamber may be provided with a mechanized drive for industrial cars without making significant foundation recesses, whereby the accompanying construction works are performed faster and they are less expensive. The corridor for transporting abrasive according to the invention may be used in the previously exploited impact chambers, not having a mechanized drive, at the site of one of the existing corridors, without any need for construction works.

Further, the traction system may be formed integrally with the longitudinal section of the corridor, as a modular assembly made under industrial conditions, which ensures repeatability, increases precision and quality of work, reduces the amount of design work preceding the assembly of the impact chamber, as well as reduces costs and time for installation of this chamber.

Throughout the present specification of the invention and the patent claims, the term "impact chamber" refers to a chamber for performing an impact treatment, said chamber being provided with one or more parallel corridors for transporting abrasive and optionally it is provided with a transverse corridor for transporting abrasive, wherein at least one of the parallel corridors for transporting abrasive has a traction system for moving the axle set along the transport track with the use of a connector transmitting a driving force from an external drive unit, said connector being carried in the loop system. Preferably, the corridor with the traction system is a central corridor in the chamber and has its transport track in the form of rail elements arranged bilaterally on the sides of the corridor. Optionally, in another preferred embodiment, the corridor with the traction system is a corridor arranged on the side of the transport track or tracks.

Throughout the present specification of the invention and the patent claims, the term "connector band placed in an individually assigned guiding slot" means that for a given connector band, an individual guiding slot is specifically provided, said guiding slot not being passed through by the other connector band or by any band of another connector.

BRIEF DESCRIPTION OF THE DRAWINGS

The solution according to the invention in its embodiments is illustrated by drawings.

FIG. 2 shows an enlarged detail A, in an axonometric view, indicated in FIG. 1a.

FIG. 3 shows, in cross-section B-B and in enlargement, a detail B indicated in FIG. 1a.

DETAILED DESCRIPTION OF THE DRAWINGS

Figure 1A:
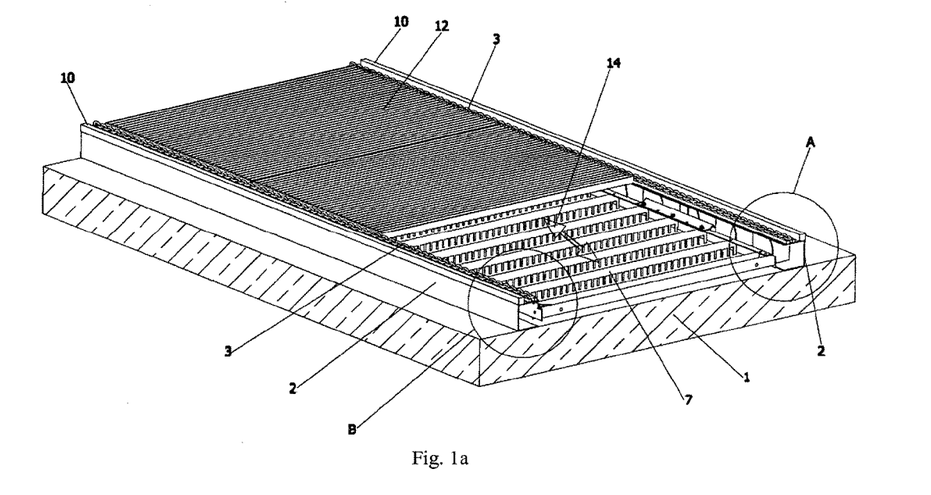
FIG. 1a shows, in an axonometric view, a portion of the corridor for transporting abrasive in the first embodiment.
Figure 1B:
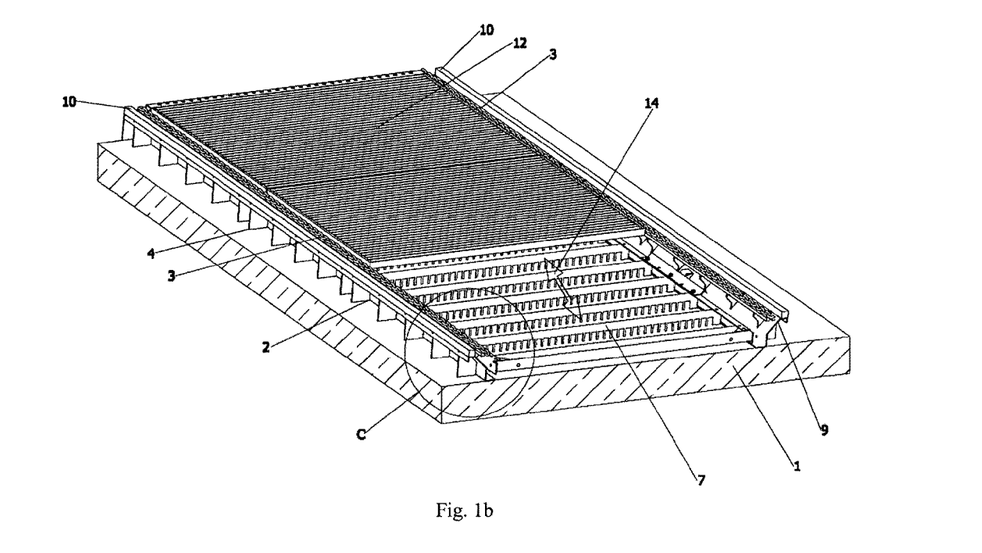
FIG. 1b shows, in an axonometric view, a portion of the corridor for transporting abrasive in the second embodiment.

The corridor for transporting abrasive in the impact chamber is used to transport granular and powdered materials used and created during impact treatment. In FIGS. 1a and 1b, a portion of the corridor according to the invention, in alternative exemplary embodiments, is shown. The corridor is laterally limited by longitudinal sections 2 resting on a foundation slab 1, said foundation slab 1 closing the corridor from the bottom. The corridor is provided with a traction system including a substantially horizontal loop, said loop including return wheels (not shown) and a connector 3. Due to the operating motion of the connector 3 driven by the return wheels, the connector 3 has two, operating and return, bands which move in opposite directions in the guiding slots arranged on top of each of the longitudinal sections 2. Preferably, the connector 3 is a chain or a rope.

In the first embodiment of the corridor according to the invention, shown in FIG. 1a, the longitudinal sections 2 limiting the corridor are U-sections with their flanges directed towards each other. One flange of each section rests on the foundation slab 1, and the external side of the other flange, constituting the top of the longitudinal section 2, defines an area for arranging elements of the traction system. Preferably, the longitudinal section 2 constituting a U-section is provided with vertically arranged reinforcing ribs 4 (seen more clearly in FIG. 2).

Figure 2:
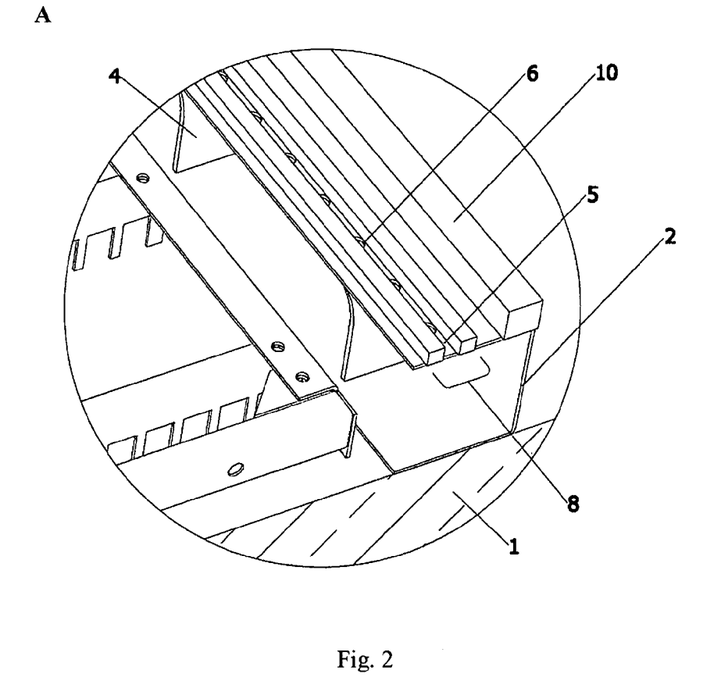

FIG. 2 shows an enlarged detail A illustrating the solution for carrying the connector 3 of the loop along the surface of the longitudinal section 2 (to show more clearly the solutions, the connector itself is not shown in FIG. 2). On top of the longitudinal section 2, there is a guiding slot 5 for accommodating the connector 3. Each band of the connector 3 (i.e. both the operating band and the return band) is placed in an individually assigned guiding slot 5 (i.e. on one longitudinal section 2, there is a guiding slot 5 for the operating band of the loop 3, and on the other one, for the return band of the connector 3, according to the view of FIG. 1a). At least in the area of the guiding slot 5, the top of the longitudinal section 2 is provided with through voids 6 for withdrawing abrasive into an abrasive recovery zone in which sweeping frames with scrapers 7 are located. In the first embodiment of the corridor according to the invention, the through voids 6 are located only in the area of the guiding slot 5 and are in the form of through holes.

Figure 3:
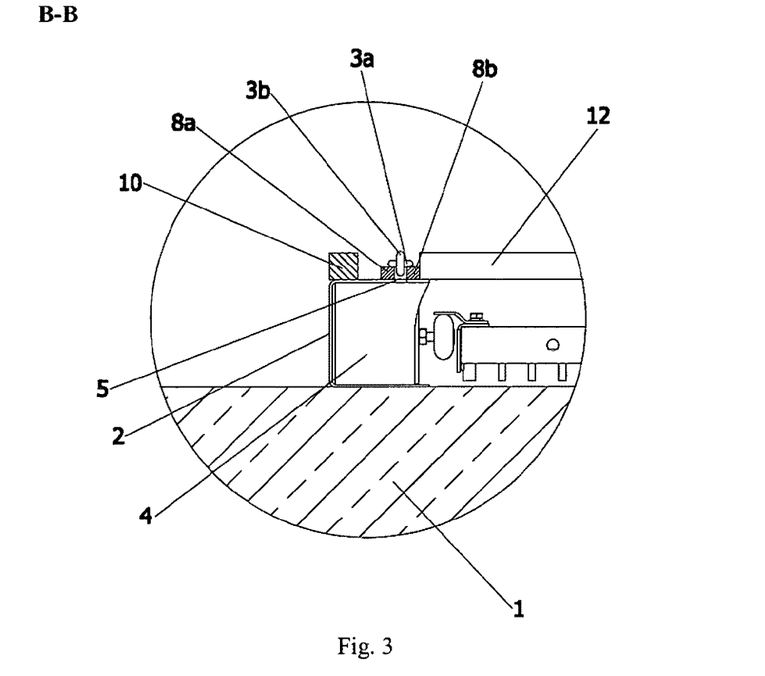

Further, with reference to FIG. 3, the guiding slot 5 is defined by a bar assembly 8 which includes one or more bars profiled so as to create a space open at the top for accommodating and carrying the connector 3. In an exemplary embodiment, the bar assembly 8 includes two bars 8a and 8b extending in parallel, which are equidistant by a dimension representing the width of the guiding slot 5. The bars 8a and 8b can be made in the form of solid sections or closed cellular sections. There are not any restrictions on the shape of the bar cross-section provided that the shape of the cross-section ensures unobstructed movement of the connector 3 in the guiding slot 5. Preferably, the shape of the bar cross-section remains substantially constant along the length of the bar. In the case of a chain connector 3 which has horizontal links 3a and vertical links 3b, width of the bars 8a, 8b should be selected so that the horizontal link 3a, resting with one side on the upper edge of the bar 8a, and with the other side on the upper edge of the bar 8b, do not protrude beyond the outer contour of the bar 8a, 8b. On the other hand, height of the bars should be selected so that at the horizontal link 3a resting on the upper surface of the bars 8a, 8b, the vertical link 3b is recessed in the guiding slot 5 leaving a gap between the bottom edge of the vertical link and the top of the longitudinal section 2. Preferably, this gap approximately corresponds to at least twice the diameter dimension of the abrasive used for impact treatment in the chamber. If the connector 3 is a rope, height of the bars should be selected so that the depth of the guiding slot 5 corresponds to the diameter dimension of the rope increased by the gap dimension which preferably approximately corresponds to at least twice the diameter dimension of the abrasive used for impact treatment in the chamber.

Referring back to FIG. 1b illustrating the second embodiment of the corridor according to the invention, in this exemplary embodiment, along with the innovative carrying of the bands of the connector 3, an innovative design solution for the longitudinal section 2 is used. The longitudinal section 2 laterally limiting the corridor constitutes a ribbed structure having a plurality of transverse ribs 4 of a width defining the width of the section 2, said ribs 4 being mounted to a formed longitudinal element 9. The ribs 4 are arranged vertically at selected intervals. The upper edges of the ribs 4 define the top of the longitudinal section 2, along which the guiding slot 5 extends which is defined by the bar assembly 8. The ribbed structures of the longitudinal section 2 are arranged specularly relative to each other so that the formed longitudinal element 9 forms a surface which laterally delimits the workspace of the corridor for transporting abrasive between the longitudinal sections 2. Preferably, the formed longitudinal element 9 is made as a blank from a flat sheet, said blank including cuts for accommodating the ribs 4, and said blank being then bent to form the formed longitudinal element 9.

Figure 5:
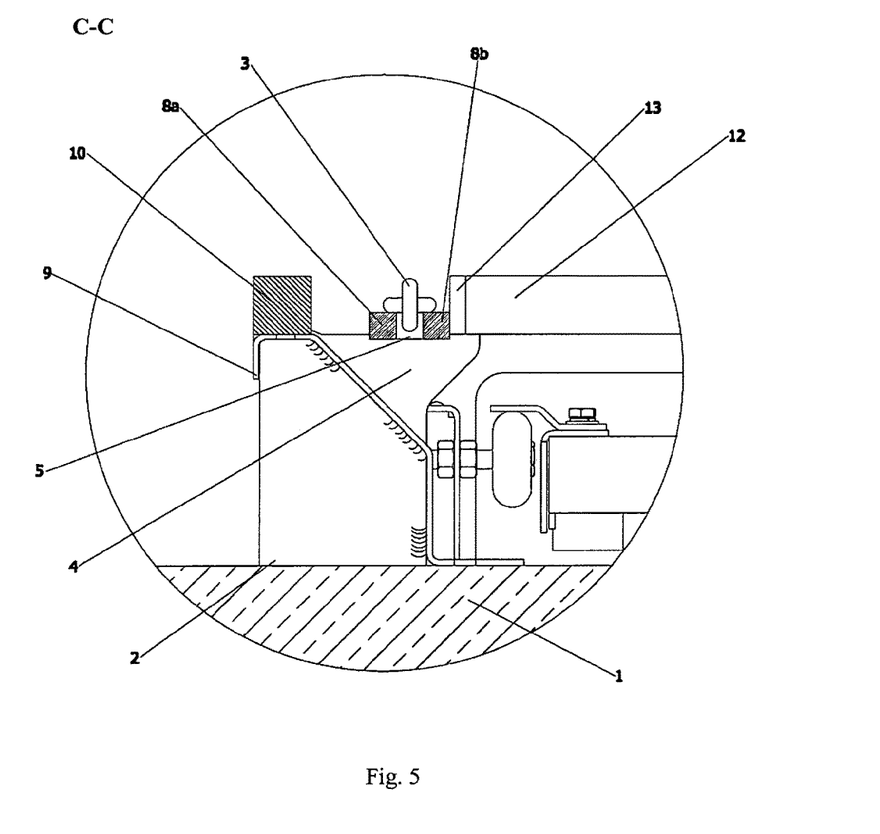
FIG. 5 shows, in cross-section C-C and in enlargement, a detail C indicated in FIG. 1b.

FIG. 5 shows an enlarged detail C illustrating the solution for carrying the connector 3 along the top of the longitudinal section 2. On top of the longitudinal section 2, there is a guiding slot 5 for accommodating the connector 3. Each band of the connector 3 is placed in an individually assigned guiding slot 5. The top of the longitudinal section 2 is equipped with trough voids 6 for withdrawing abrasive into an abrasive recovery zone in which sweeping frames with scrapers 7 are located. In this embodiment of the corridor according to the invention, the through voids 6 are located between vertical ribs 4, and the formed longitudinal element 9, having its surface shaped with a slope towards the workspace of the corridor for transporting abrasive, ensures gravitational discharge of abrasive into this workspace.

Similarly to the first embodiment of the corridor, the guiding slot 5 is defined by the bar assembly 8 which includes one or more bars profiled so as to create a space open at the top for accommodating and carrying the connector 3. For example, the bar assembly 8 includes two bars 8a and 8b extending in parallel, which are equidistant by a dimension representing the width of the guiding slot 5. The bars 8a and 8b are made in the form of solid sections or closed cellular sections. There are not any restrictions on the shape of the bar cross-section provided that the shape of the cross-section ensures unobstructed movement of the connector 3 in the guiding slot 5. Preferably, the shape of the bar cross-section remains substantially constant along the length of the bar. More preferably, in the case of the chain and/or rope connector 3, with respect to the bars 8a, 8b, the restrictions mentioned above, when discussing the first embodiment of the Corridor according to the invention, are applicable.

As shown in FIGS. 1a and 1b, and more particularly in cross-sections of FIG. 3 and FIG. 5, on the top of the longitudinal section 2, externally to the bar assembly 8, there are rail elements 10 of the transport track, which are designed to move the axle set in the impact chamber equipped with the corridor for transporting abrasive according to the invention. The rail elements are equidistant relative to each other and extend substantially in parallel to the axis of the corridor, said axis is a formal line drawn centrally between the longitudinal sections 2 laterally limiting the corridor. The connection of the axle set to the connector 3 is a permanent connection or a releasable connection and can be realized as a sliding bolt with a guide bar mounted to the axle set, said bolt is coupled with the connector 3, for example, by pushing in a horizontal link of the connector or by connecting by a gripper assembly to the rope.

Figure 4:
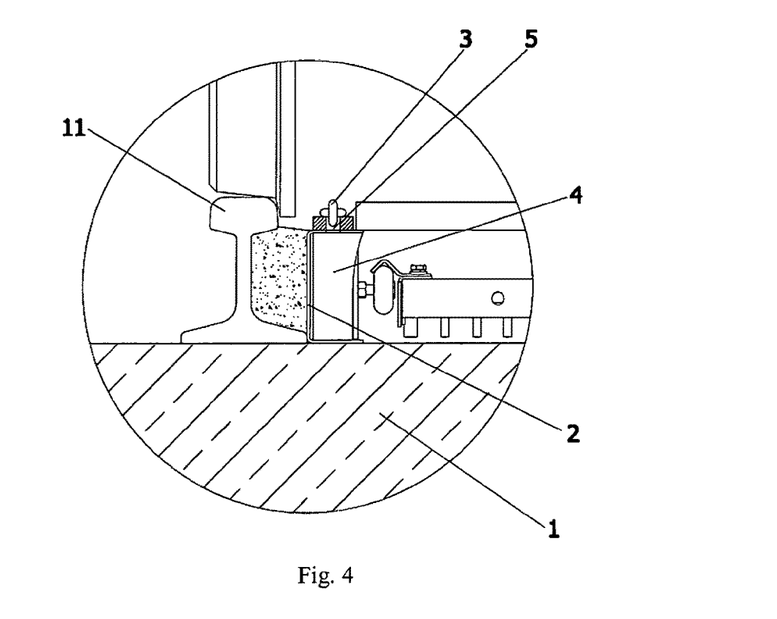
FIG. 4 shows, in cross-section and in enlargement, an alternative embodiment in relation to the solution according to FIG. 3.

Alternatively, the rail elements 10 of the transport track are arranged externally to the longitudinal section 2, equidistant relative to each other and substantially parallel relative to the axis of the corridor. In an exemplary embodiment, the rail element is a rail 11 resting on the foundation slab 1 next to the longitudinal section 2, externally to this section 2 (as illustrated in FIG. 4).

Figure 6:
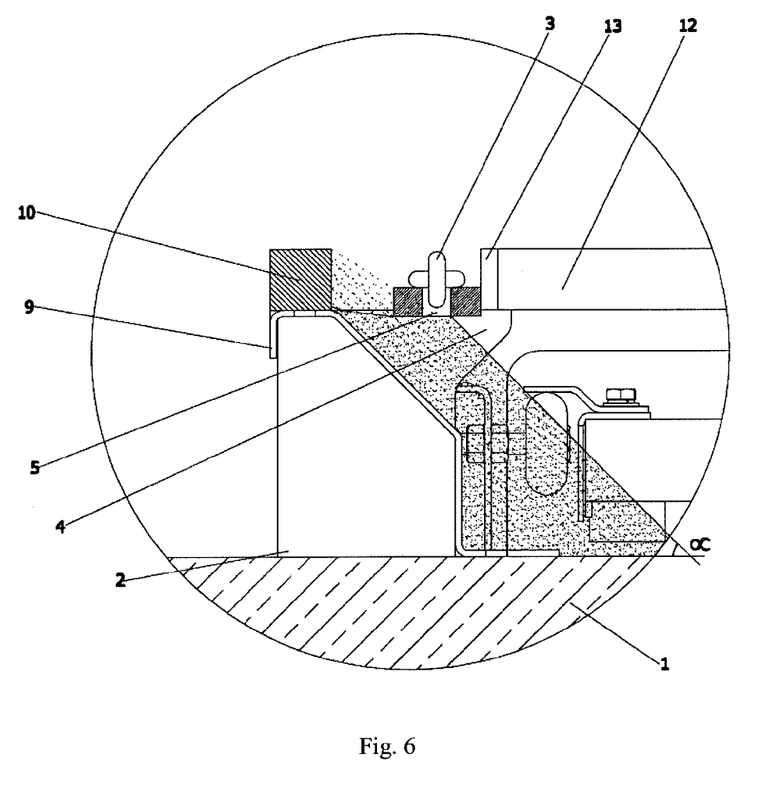
FIG. 6 shows, in cross-section and in enlargement, a preferred aspect of using the solution according to FIG. 5.

In the solution of the corridor for transporting abrasive according to the invention, the sweeping frames and the scrapers 7 in the workspace of the corridor for transporting abrasive are envisaged to be arranged so that the abrasive flowing through the through voids 6 reach the working zone operated by the scrapers. This ensures an efficient discharge of abrasive from the top of the longitudinal sections 2, and therefore from the guiding slot 5 and from the rail elements 10. Since the angle of filling up with abrasive (angle a indicated in FIG. 6) is at least 45°, preferably a boundary line of the scrapers' working zone should be located closer to the longitudinal section 2 than an intersection line of the plane of the foundation slab 1 with the plane including an edge of the guiding slot 5 (closer to the platform grating 12) and inclined towards the plane of the foundation slab at angle a of at least 45° (as illustrated in FIG. 6).

EXAMPLES

Example 1

The corridor for transporting abrasive rests on the foundation slab 1 and has two stationary longitudinal U-sections 2 having their flanges directed towards each other in a longitudinal arrangement. The corridor has a length of several to tens of meters and a constant width selected from the range of 500-1700 mm, said width being defined by a distance between the external edges of the longitudinal sections 2. Another stationary longitudinal section, parallel to the section 2, constitutes a limitation of the next corridor in a neighboring arrangement.

The platform gratings 2 rest on the stationary longitudinal sections 2. In the workspace of the corridor, the sweeping frames with the scrapers 7 are mounted. The scrapers are set into a reciprocating motion in the direction indicated by arrow 14 with the use of a drive unit, for example a motoreducer with an eccentric or with the use of a pneumatic actuator.

Two bars 8a and 8b defining the guiding slot 5, equidistant relative to each other and spaced so as to ensure free movement of the vertical link 3b of the chain connector 3, rest on each of the longitudinal sections 2. Height of the bars 8a and 8b is selected so that the horizontal links 3a of the chain connector 3 rest on the bars 8a, 8b. On the other hand, width of bars 8a and 8b is selected so that the horizontal link 3a does not protrude beyond their contour. The bars are rods of rectangular or square cross-section. The bar 8b constitutes a side limiter for the platform grating 12.

In the area of the guiding slot 5, i.e. between the bars 8a and 8b, through holes of a diameter close to the distance between these sections, at intervals equal to the length of the link 3b of the chain connector 3 are made. The chain connector 3 is driven by a drive unit located outside the impact chamber, for example with the use of a motoreducer and a gear wheel assembly of a span corresponding to the width of the corridor. As the connector 3, a hardened chain having the following links is used: 8×24 EN 818-2 or 13×39 EN 818-2.

To increase the maximum allowable point load (200×200 mm) to above 100 kg, reinforcements of the longitudinal U-section 2 in the form of transverse ribs 4, mounted at intervals of about 200 mm, are used. The platform grating 12 made of a flat bar of 30×4 mm ensures an allowable load of above 1000 kg/m$^2$.

Height of the corridor according to the invention does not exceed 150 mm.

The axle set (a car) moves along the rail elements 10 (square solid sections of 30×30 mm) located on the longitudinal sections 2. The connection of the car with the chain connector is realized with the use of a sliding bolt with a guide bar mounted to the car, said bolt being driven into the horizontal link of the chain 3a.

Example 2

The solution according to Example 1 is used but with the use of railway rails 11, as the rail elements, resting directly on the foundation slab 1, said rails being located next to the longitudinal sections 2, externally relative to the sections 2 (according to FIG. 4). The axle set (a platform) moves along the rails 11. The connection of the platform with the chain connector is realized with the use of a sliding bolt with a guide bar mounted to the platform, said bolt being driven into the horizontal link of the chain 3a.

Example 3

The corridor for transporting abrasive rests on the foundation slab 1 and has two stationary longitudinal sections 2 which are made in the form of ribbed structures arranged specularly relative to each other. Each of the longitudinal sections 2 is prepared as follows. A rectangular metal sheet with a thickness of 2-3 mm with a length corresponding to the length of the corridor is prepared, said sheet is subjected to laser cutting at equal intervals to form narrow transversal cuts. Then, the sheet is bent with a bending machine (longitudinal bending) to obtain the formed longitudinal element 9 of a cross-section shown in FIG. 5. In the previously made cuts, the ribs 4 (flat blanks shaped as illustrated in FIG. 5) are placed vertically and are welded on the edges to the formed longitudinal element 9, thereby obtaining the desired longitudinal section 2.

Two bars 8a and 8b defining the guiding slot 5, equidistant relative to each other and spaced so as to ensure free movement of the vertical link 3b of the chain connector 3, rest o each of the longitudinal sections 2. Height of the bars 8a and 8b is selected so that the horizontal links 3a of the chain connector 3 rest on the bars 8a, 8b. Width of the bars 8a and 8b is selected so that the horizontal link 3a does not protrude beyond their contour. The bars are rods of square cross-section. The bar 8b constitutes a side limiter for the platform grating 12.

The chain connector 3 is driven by a drive unit located outside the impact chamber, for example with the use of a motoreducer and a gear wheel assembly of a span corresponding to the width of the Corridor. As the connector 3, a hardened chain having the following links is used: 8×24 EN 818-2 or 13×39 EN 818-2.

The platform grating 12 is made of a flat bar of 30×4 mm, except that the edge 13 of the platform grating designed to rest on the ribs 4 of the longitudinal section 2 is made of a thicker flat bar of at least 30×10 mm.

Height of the corridor according to the invention does not exceed 150 mm.

The axle set (a car) moves along the rail elements 10 (square solid sections of 30×30 mm) located on the longitudinal sections 2. The connection of the car with the chain connector is realized with the use of a sliding bolt with a guide bar mounted to the car, said bolt being driven into the horizontal link of the chain 3a.

INDUSTRIAL APPLICABILITY

The corridor for transporting abrasive is designed for use in the impact chambers characterized by a workspace having a width of 1.5 m to several meters, with a length of a few to tens of meters and with a varying height. The corridor according to the invention is typically used as a central corridor in the chamber, but it can be also used as a lateral one. In the chambers, manual or robotized treatment is used.

The corridor can be used for various loads of axle sets (from 1 T to 500 T) and with a large variety of axle sets (which can be, for example, platforms, universal cars with a support surface of 1 $m^2$ to tens of $m^2$, universal stands, specialized cars, single or combined cars). The corridor can be used in a particular case when the axle set itself is the subject of treatment (carriages, rail vehicles). The scope of the invention is not limited to a particular type of abrasive used in the impact chambers (said abrasive being, for example, metal shot, glass, ceramic, mineral or plant abrasive, in a sharp-edged or spherical form of varying granulation of tens of microns to several millimeters).

We claim:

1. A corridor for transporting abrasive in an impact chamber, said corridor comprising:
   longitudinal sections resting on a foundation slab and forming lateral limits, and
   a traction system for moving an axle set along a transport track, said traction system being equipped with a substantially horizontal loop being comprised of loop return wheels and a loop connector having two bands moving in opposite directions, wherein each band of the loop connector is placed in an individually assigned guiding slot, arranged on top of the longitudinal section,
   wherein the top of the longitudinal section is equipped with through voids for withdrawing abrasive, at least in an area of the guiding slot.

2. The corridor, according to claim 1, wherein said guiding slot is comprised of a bar assembly mounted on top of the longitudinal section.

3. The corridor, according to claim 2, wherein said bar assembly comprises two bars extending in parallel, equidistant relative to each other by a width of the guiding slot.

4. The corridor, according to claim 2, wherein the longitudinal sections are comprised of ribbed structures arranged specularly relative to each other, wherein each ribbed structure has a plurality of transverse ribs of a width defining width of a respective longitudinal section, said transverse ribs being mounted to a formed longitudinal element fixing position of the ribs vertically and at selected intervals, wherein upper edges of the ribs defining the top of the longitudinal section for mounting the bar assembly, and a formed longitudinal element form a surface, laterally defining a workspace for transporting abrasive between the longitudinal sections.

5. The corridor, according to claim 4, wherein said formed longitudinal element comprises a formed blank from a flat sheet, said blank comprising cuts for accommodating the ribs.

6. The corridor, according to claim 2, wherein said loop connector is a chain connector comprising horizontal links and vertical links, wherein a horizontal link rests on an upper surface of said bar assembly, wherein a vertical link is partially recessed in the guiding slot, and wherein depth of said vertical link is selected so that there is a gap between a bottom edge of the vertical link and the longitudinal section, said gap corresponding to at least twice a dimension of abrasive grain diameter.

7. The corridor, according to claim 1, wherein the longitudinal sections are comprised of U-sections having flanges directed towards each other so that one flange of each U-section rests on the foundation slab, and an external side of another flange constitutes the top of the longitudinal section.

8. The corridor, according to claim 7, wherein the top of the longitudinal section is equipped with through voids for withdrawing abrasive, at least in an area of the guiding slot, and wherein the through voids for withdrawing abrasive are formed in a flange of the longitudinal section only in the area of the guiding slot.

9. The corridor, according to claim 7, wherein each longitudinal U-section comprises reinforcing ribs mounted so as to be substantially vertical between flanges of a longitudinal section.

10. The corridor, according to claim 1, wherein said transport track comprises a rail element mounted externally to the guiding slot, on top of the longitudinal section.

11. The corridor, according to claim 1, wherein said transport track comprises a rail element formed by a rail mounted externally to the guiding slot and next to the longitudinal section.

12. A corridor for transporting abrasive in an impact chamber, said corridor comprising:
    longitudinal sections resting on a foundation slab and forming lateral limits; and
    a traction system for moving an axle set along a transport track, said traction system being equipped with a substantially horizontal loop being comprised of loop return wheels and a loop connector having two bands moving in opposite directions, wherein each band of the loop connector is placed in an individually assigned guiding slot, arranged on top of the longitudinal section, wherein said guiding slot is comprised of a bar assembly mounted on top of the longitudinal section,
    wherein said loop connector is a rope,
    wherein depth of the guiding slot is selected so as to correspond to at least a dimension of a rope diameter increased by a gap dimension, and
    wherein a gap approximately corresponds to at least twice a dimension of abrasive grain diameter.

13. A method for moving an axle set in an impact chamber having a corridor for transporting abrasive, said method comprising the steps of:
    laterally limiting said corridor by longitudinal sections resting on a foundation slab, said corridor having a traction system for moving the axle set along a transport track;

providing said traction system with a substantially horizontal loop comprising loop return wheels and a loop connector having two bands moving in opposite directions;

carrying each band of the loop connector in an immediate vicinity of a side edge of said corridor for transporting abrasive, on top of the longitudinal section; and withdrawing abrasive accumulating on top of the longitudinal section into a space between longitudinal sections via through voids in the longitudinal section.

14. The method, according to claim 13, further comprising the step of:

carrying each band of the loop connector in an individually assigned guiding slot, defined by a bar assembly mounted on top of the longitudinal section.

15. The method, according to claim 14, further comprising the step of:

moving said axle set along the transport track comprised of rail elements arranged in parallel to an axis of said corridor, each rail element being mounted on top of the longitudinal section, externally to a bar assembly.

16. The method, according to claim 14, further comprising the step of:

moving said axle set along the transport track comprised of rail elements arranged in parallel to an axis of said corridor, each rail element being comprised of a rail mounted externally to the longitudinal section.

* * * * *